US011218384B2

(12) United States Patent
Wen et al.

(10) Patent No.: US 11,218,384 B2
(45) Date of Patent: Jan. 4, 2022

(54) METHOD OF CREATING AND DELETING VWLAN DYNAMICALLY IN A FIXED ACCESS NETWORK SHARING ENVIRONMENT

(71) Applicant: Alcatel Lucent, Nozay (FR)

(72) Inventors: Haibo Wen, Shanghai (CN); Shuigen Yang, Shanghai (CN); Kaibin Zhang, Shanghai (CN)

(73) Assignee: Alcatel Lucent, Nozay (FR)

( * ) Notice: Subject to any disclaimer, the term of this patent is extended or adjusted under 35 U.S.C. 154(b) by 242 days.

(21) Appl. No.: 15/735,747

(22) PCT Filed: May 30, 2016

(86) PCT No.: PCT/IB2016/000916
§ 371 (c)(1),
(2) Date: Dec. 12, 2017

(87) PCT Pub. No.: WO2016/193823
PCT Pub. Date: Dec. 8, 2016

(65) Prior Publication Data
US 2018/0139095 A1    May 17, 2018

(30) Foreign Application Priority Data
Jun. 2, 2015    (CN) .......................... 201510296416.7

(51) Int. Cl.
*H04L 29/06*    (2006.01)
*H04L 12/24*    (2006.01)
(Continued)

(52) U.S. Cl.
CPC ...... *H04L 41/5051* (2013.01); *H04L 41/0886* (2013.01); *H04L 41/5077* (2013.01);
(Continued)

(58) Field of Classification Search
CPC ............. H04L 41/0886; H04L 41/5051; H04L 41/5077; H04L 63/0272; H04L 63/0876;
(Continued)

(56) References Cited

U.S. PATENT DOCUMENTS 6,847,620 B1 * 1/2005 Meier ................. H04L 12/4641
370/328
7,535,880 B1    5/2009 Hinman et al.
(Continued)

FOREIGN PATENT DOCUMENTS

CN    1759620 A    4/2006
CN    1878133 A    12/2006
(Continued)

OTHER PUBLICATIONS

Chinese Office Action dated Jun. 10, 2019, issued in corresponding Chinese Patent Application No. 201510296416.7.
(Continued)

*Primary Examiner* — Carl G Colin
*Assistant Examiner* — Han Yang
(74) *Attorney, Agent, or Firm* — Harness, Dickey & Pierce, P.L.C.

(57) ABSTRACT

A new interact procedure among a user equipment, an infrastructure provider, a virtual network operator and a corresponding access node and a corresponding access point is provided. Thus, the vWLAN can be created and deleted dynamically for the virtual network operator, such that the vWLAN of the virtual network operator can be utilized efficiently. Thereby, the virtual network operator can deploy its vWLANs in the hotspots dynamically according to the requirement. The flexibility is enhanced, while the requirement for the virtual network operator and actual subscription is met.

11 Claims, 3 Drawing Sheets

(51) Int. Cl.
*H04W 84/12* (2009.01)
*H04W 12/069* (2021.01)
*H04W 12/08* (2021.01)
*H04W 48/10* (2009.01)

(52) U.S. Cl.
CPC ...... *H04L 63/0272* (2013.01); *H04L 63/0876* (2013.01); *H04W 12/069* (2021.01); *H04W 12/08* (2013.01); *H04W 84/12* (2013.01); *H04W 48/10* (2013.01)

(58) Field of Classification Search
CPC ..... H04W 12/08; H04W 12/06; H04W 84/12; H04W 48/10; H04W 76/00; H04W 16/18; H04W 12/0609; H04W 12/069
See application file for complete search history.

(56) References Cited

U.S. PATENT DOCUMENTS

| | | | | |
|---|---|---|---|---|
| 8,752,160 B1* | 6/2014 | Delker | ................ | H04L 63/0272 726/11 |
| 2004/0228319 A1* | 11/2004 | Melville | ............... | H04W 48/18 370/349 |
| 2009/0067436 A1 | 3/2009 | Gast et al. | | |
| 2009/0181641 A1 | 7/2009 | Fiatal | | |
| 2010/0208619 A1* | 8/2010 | Ho | ...................... | H04L 12/4641 370/254 |
| 2010/0290445 A1* | 11/2010 | Ankaiah | ............. | H04L 12/4633 370/338 |
| 2013/0283050 A1 | 10/2013 | Gupta et al. | | |
| 2013/0286921 A1* | 10/2013 | Agarwal | ............. | H04L 29/0653 370/312 |
| 2014/0127994 A1* | 5/2014 | Nightingale | ........... | H04W 4/80 455/41.1 |
| 2015/0156815 A1* | 6/2015 | Pang | ...................... | H04L 45/48 370/338 |
| 2015/0271169 A1* | 9/2015 | Seligson | ............ | H04L 12/4645 726/4 |
| 2016/0226790 A1* | 8/2016 | Lee | ...................... | H04L 47/762 |

FOREIGN PATENT DOCUMENTS

| | | |
|---|---|---|
| CN | 103716213 A | 4/2014 |
| WO | WO-2004/013986 A1 | 2/2004 |
| WO | WO-2004/073237 A2 | 8/2004 |
| WO | WO-2014/049432 A2 | 4/2014 |
| WO | WO-2014049432 A2 * | 4/2014 ........... H04L 45/586 |

OTHER PUBLICATIONS

International Search Report PCT/ISA/210 for International Application No. PCT/IB2016/000916 dated Oct. 26, 2016.

* cited by examiner

METHOD OF CREATING AND DELETING VWLAN DYNAMICALLY IN A FIXED ACCESS NETWORK SHARING ENVIRONMENT

CROSS-REFERENCE TO RELATED APPLICATIONS

This application is a national phase under 35 U.S.C. § 371 of PCT International Application No. PCT/IB2016/000916 which has an International filing date of May 30, 2016, which claims priority to Chinese Application No. 201510296416.7, filed Jun. 2, 2015, the entire contents of each of which are hereby incorporated by reference.

FIELD OF THE INVENTION

The present disclosure generally relates to a method of creating and deleting vWLAN dynamically in a fixed access network sharing environment.

BACKGROUND OF THE INVENTION

Network Virtualization has been a hot topic in the recent communication development. In a Fixed Access Network Sharing (FANS) environment, one physical fixed access network can be divided into multiple Virtual Access Networks (VAN) by an Infrastructure Provider (InP), which are controlled and managed by multiple virtual network operators (VNO) respectively. Then, the VNO provides differentiated services without depending on the physical fixed access network heavily. In one VAN, the VNO can design its own forwarding mechanism and even protocol stack which can be specially designed for its own value-added service. Further, the VNO can ask the InP to establish its VAN to meet their subscribers' requirements. Thereby, the drawback of the limitation and the lack of flexibility in the current network can be overcome, and the benefits are brought to the InP and the VNO.

On the other hand, more and more InPs are deploying Wi-Fi hotspots as their extension to their fixed access network. Thus, how to share WiFi, that is how to provide vWLAN (visualized WLAN) for VNO has become a hot topic.

Moreover, in a multiservice broadband network, the subscribers (i.e. users of the VNO) are not just fixed ones, but also nomadic ones. In a Fixed Access Network Sharing (FANS) environment, in order to attract more subscribers and provide better QoE to their subscribers, the VNOs always want to deploy their VANs to cover as large area as possible. Therefore, VNOs would ask the IMP to deploy their VNOs in the public hotspots/hot-zones. Thus, it will be beneficial to set the vWLAN of the VNO according to the dynamic change of the subscribers. Further, it is possible that one vWLAN is set by the VNO in one area where there is no VNO subscribers. This will waste many resources.

Thus, how to avoid the resource waste for the VNO, how to create/delete vWLAN in hotspots/hot-zones according to the requirement is a pending problem. The network utilization can be much improved if the vWLAN of the VNO can be dynamically created/deleted.

SUMMARY OF THE INVENTION

Herein, in view of above background, it is provided a method of configuring (creating/deleting) vWLAN dynamically in a fixed access network sharing environment.

According to a first aspect of the present invention, it is provided a method, in a user equipment in a fixed access network sharing environment, of assisting an infrastructure provider and a virtual network operator to create vWLAN dynamically, comprising: receiving broadcast from an access point, wherein the broadcast includes a SSID of a public WLAN; accessing the public WLAN based on the SSID of the public WLAN; sending an authentication request to the access point, wherein the authentication request includes domain information of the virtual network operator; receiving an authentication result message from the infrastructure provider, wherein the authentication result message includes a SSID of the vWLAN; and accessing the vWLAN via the access point based on the SSID of the vWLAN.

According to a second aspect of the present invention, it is provided a method, in an infrastructure provider in a fixed access network sharing environment, of creating vWLAN dynamically, comprising: receiving an authentication request from an access node, wherein the authentication request includes domain information of a virtual network operator and location information set by the access node and/or a access point, and the location information is used to indicate location of the vWLAN; determining the virtual network operator based on the domain information of the virtual network operator, and forwarding the authentication request to the virtual network operator; receiving an indication message from the virtual network operator, wherein the indication message indicates to create the vWLAN and includes parameters of the vWLAN; creating the vWLAN with the parameters of the vWLAN at the location; and sending an authentication result message to the user equipment, wherein the authentication result message indicates the user equipment to access the vWLAN and includes a SSID of the vWLAN.

According to a third aspect of the present invention, it is provided a method, in a virtual network operator in a fixed access network sharing environment, of creating vWLAN dynamically, comprising: receiving an authentication request from an infrastructure provider, wherein the authentication request includes domain information of the virtual network operator and location information, and the location information is used to indicate location of the vWLAN; configuring parameters for the vWLAN based on the authentication request; and sending an indication message to the infrastructure provider, wherein the indication message indicates to create the vWLAN and includes the parameters of the vWLAN.

According to a fourth aspect of the present invention, it is provided a method, in a user equipment in a fixed access network sharing environment, of assisting an infrastructure provider and a virtual network operator to delete vWLAN dynamically, comprising: sending an indication information to the virtual network operator, when the user equipment disconnects the vWLAN, wherein the indication information indicates that the user equipment disconnects the vWLAN.

According to a fifth aspect of the present invention, it is provided a method, in an access point in a fixed access network sharing environment, of assisting an infrastructure provider and a virtual network operator to delete vWLAN dynamically, comprising: sending an indication information to the virtual network operator, when detecting that the user equipment disconnects the vWLAN, wherein the indication information indicates that the user equipment disconnects the vWLAN.

According to a sixth aspect of the present invention, it is provided a method, in a virtual network operator in a fixed access network sharing environment, of deleting vWLAN dynamically, comprising: receiving an indication information from a user equipment or an access point of the vWLAN, which indicates that the user equipment disconnects the vWLAN; subtracting the number of the authorized user equipments of the vWLAN by one based on the indication information; checking whether the number of the authorized user equipments is zero; sending a vWLAN deletion command to the infrastructure provider if the number of the authorized user equipments is zero, and the vWLAN deletion command includes a SSID and location of the vWLAN; and receiving a vWLAN deletion acknowledgement from the infrastructure provider, which indicates that the vWLAN is deleted successfully.

According to a seventh aspect of the present invention, it is provided a method, in an infrastructure provider in a fixed access network sharing environment, of deleting vWLAN dynamically, comprising: receiving a vWLAN deletion command from a virtual network operator, wherein the vWLAN deletion command includes a SSID and location of the vWLAN; deleting the vWLAN based on the vWLAN deletion command; and sending a vWLAN deletion acknowledgement to the virtual network operator, which indicates that the vWLAN is deleted successfully.

Through the present invention, vWLAN can be created/deleted dynamically, such that the vWLAN of the VNO can be utilized efficiently. Thereby, the VNO can deploy its vWLANs in the hotspots dynamically according to the requirement. The flexibility is enhanced, while the requirement for the VNO and actual subscription is met. Further, the present invention can absorb more nomadic subscribers and can save CAPEX of the VNO.

BRIEF DESCRIPTION OF DRAWINGS

Other features, objects and advantages of the invention will become more apparent upon review of the following detailed is description of non-limiting embodiments taken with reference to the drawings in which.

In the drawings, identical or like reference numerals denote identical or corresponding components or features throughout the different figures.

DETAILED DESCRIPTION OF EMBODIMENTS

The basic idea of the proposed method of configuring (creating/deleting) vWLAN dynamically in a fixed access network sharing environment is in that:

Normally, a public physical WLAN is deployed on each InP's Wi-Fi Access Point (AP) by the InP. According to the present invention, other vWLANs will be created for the VNO dynamically on demand. This means that InP creates/deletes the vWLAN for a VNO upon receiving the corresponding command from the VNO.

vWLAN information table

The VNO maintains information for the existing vWLAN for each location. This could be implemented by creating a vWLAN information table, for example. This vWLAN information table includes the information associated with each vWLAN managed by the VNO (This would be discussed in detail in the following).

a vWLAN creation/deletion procedure proposed according o the present invention

If not scanning the desired VNO's vWLAN, the user equipment firstly accesses via InP's public WLAN, which helps it access the desired VNO's vWLAN then. This vWLAN may have been created at this location or will be dynamically created then.

Herein, the creation progress will be described firstly, for example:

1. Each AP broadcasts the InP's public WLAN's default SSID (Service Set Identifier) in the WLAN Beacon frame. The SSIDs for the active vWLANs, which have already been created at this location, can also be optionally broadcast.

2. A user equipment can firstly access the network via the SSID of the public WLAN, and send an authentication request. The InP's controller (or the Control & Management Platform, InP-CMP) will send this authentication request and the related location information to the corresponding VNO. This corresponding VNO can be determined by the domain information in the authentication request, for example. VNO's Control & Management Platform (VNO-CMP) will authenticate whether this user equipment is its subscriber, and determine whether a new vWLAN should be created on this location. Upon receiving the authentication pass and creating vWLAN message from the VNO-CMP, the InP-CMP will create a new vWLAN for this VNO. This could be created with the vWLAN parameters specified by the VNO, for example. Then, the In-CMP will help this user equipment to access this new created vWLAN. Alternatively, if the authentication fails, the service for the user equipment will be rejected.

Figure 1:
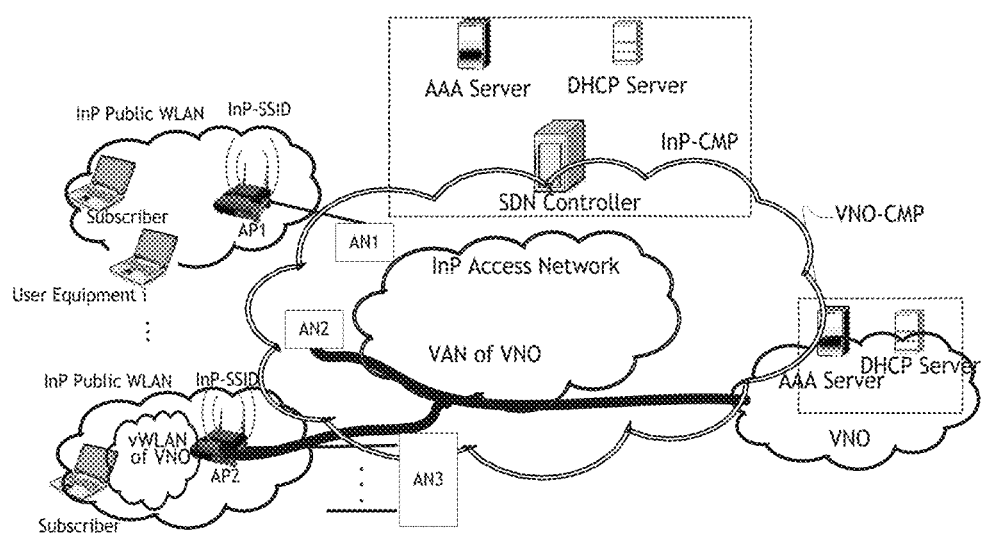
FIG. 1 shows an architecture diagram for a Fixed Access Network Sharing environment according to an embodiment of the present invention.

FIG. 1 shows an architecture diagram for a Fixed Access Network Sharing environment according to an embodiment of the present invention. Each element in FIG. 1 will be described with respect to FIG. 1 in the following.

As shown in FIG. 1, the InP's fixed access network provides multiple network slices to meet different VNOs' requirements. This is realized by a specified coverage and topology, for example. In this progress, it also includes creating the needed vWLANs in the corresponding hotspots/hot-zones.

The InP-CMP includes a SDN controller, an AAA server and a DHCP server and etc.

The SDN controller implements all the control plane functions of the access network. The SDN controller has communication interfaces to other auxiliary servers (e.g., AAA server and DHCP server). The SDN controller has the following functions: (1) control/manage all the network elements in the access network; (2) VAN computation and creation for VNO; (3) vWLAN creation/deletion management.

The AAA server and the DHCP server help to control, manage the physical fixed access network. The AAA server in the InP can interactively contact with the VNO's AAA server for further check/authentication. Of course, these severs may be implemented as logical modules in the SDN controller, too.

The WiFi APs in FIG. 1 are controlled by the InP-CMP (SDN controller, for example) to implement (create or delete, for example) the needed vWLAN of the VNO. Normally, the InP-SSID for the public WLAN is broadcast via a Wi-Fi Beacon frame. Depending on the VNO's policy, the SSIDs of the vWLANs of the VNO may be either broadcast or not on this AP.

FIG. 1 also shows other network elements in the data plane. Access nodes (ANs) (which are connected with multiple APs, for example) and switches in the data plane are controlled/managed by the SDN controller. VNOs' VANs are established on these network elements and the related links if needed.

The network managed by the VNO includes at least one VAN in the InP's fixed access network and the vWLAN, which belongs to the VAN (In reality, the VAN includes the vWLANs belonging to this VNO). This VAN has its own logical control/management platform (VNO-CMP), including the AAA server, the DHCP server. Those servers are used to control/manage VNO's network and its VAN, and the subscribers of this VNO.

A vWLAN information table of the vWLAN managed by a VNO is configured in the VNO. Herein, the VNO stores and tracks the information of the active vWLAN in the fixed access network of the InP. The VNO can dynamically send request to the InP to create/delete some vWLANs on some locations.

Each VNO maintains the information about its vWLANs. This information includes the location, the SSID of vWLAN (vWLAN-SSID), whether to broadcast the SSID of vWLAN or not, the number of authorized subscribers, encryption method, bandwidth and etc. Table 1 shows an example for a vWLAN information table of a VNO.

TABLE 1 vWLAN Information Table

| Location | vWLAN-SSID | Whether to broadcast SSID | Number of authorized subscribers | Encryption method | Bandwidth |
|---|---|---|---|---|---|
| AP1.AN1 | VNO-SSID | Yes | 2 | WEP | 54 Mbps |
| AP2.AN3 | VNO-SSID | No | 1 | WPA2 | 11 Mbps |
| ... | ... | ... | ... | ... | ... |

When the number of the authorized subscribers becomes zero, the VNO will indicate the InP to delete the corresponding vWLAN.

The detail procedure for creating/deleting vWLAN in a Fixed Access Network Sharing environment will be discussed in detail in below with respect to FIG. 2 and FIG. 3.

Figure 2:
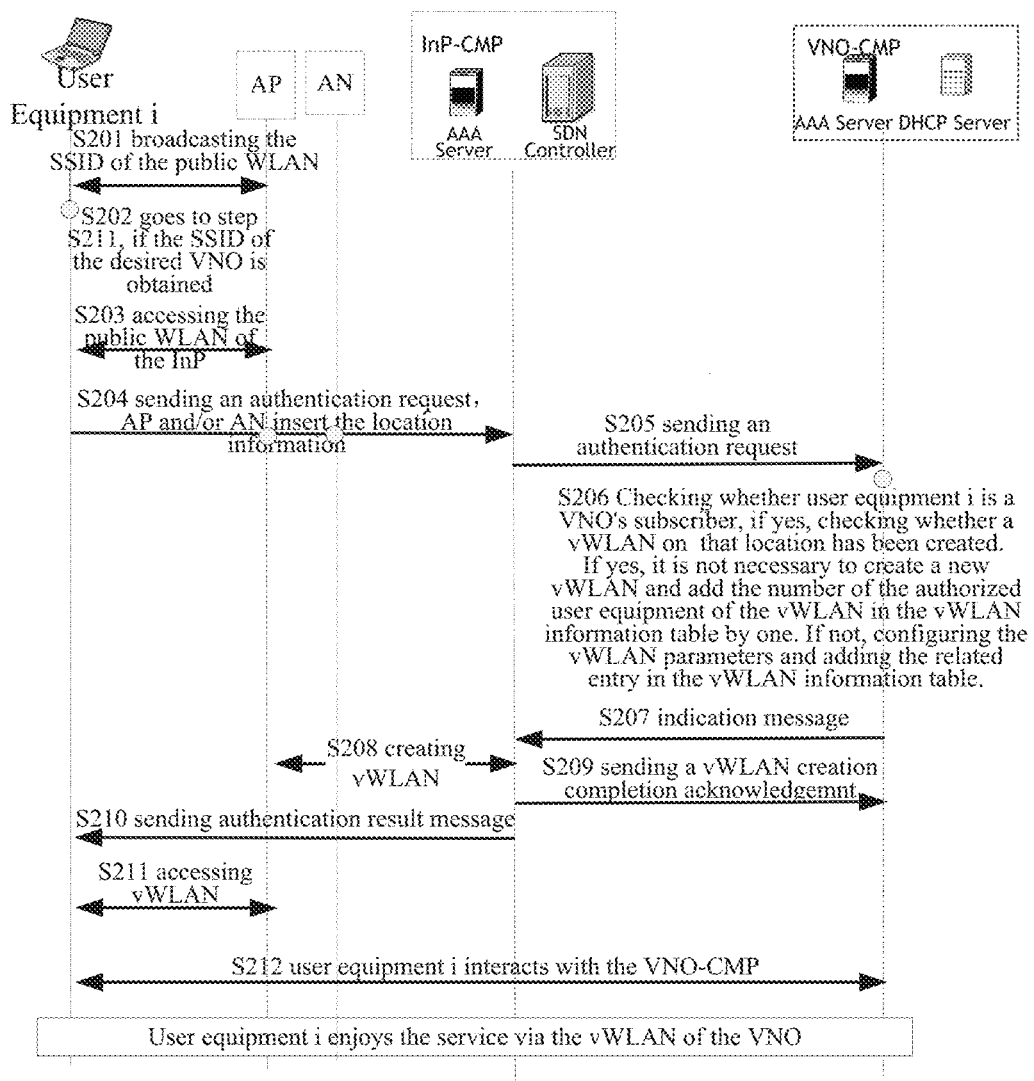
FIG. 2 shows a flowchart for a method of creating a vWLAN in a Fixed Access Network Sharing environment according to an embodiment of the present invention.

FIG. 2 shows a flowchart for a method of creating a vWLAN in a Fixed Access Network Sharing environment according to an embodiment of the present invention.

FIG. 2 is based on the following scenario, for example: one new user equipment appears in a hotspot of a certain VNO, and thereby a vWLAN will be created for this user equipment dynamically on demand. For example, as shown in FIG. 1, the user equipment i of the VNO moves to a hotspot and wants the service from the desired VNO, while the VNO has no vWLAN in this hotspot at this moment and thereby will create a new vWLAN dynamically.

As shown in FIG. 2, in step S201, the AP of the public WLAN (AP1 as shown in FIG. 1, for example) will broadcast the SSID of the public WLAN. This will be implemented by either a Beacon frame or a Probe Response frame. The user equipment i will scan this broadcast signal to obtain the SSID of the public WLAN. This public WLAN is a physical WLAN deployed by the InP, the SSID of which is set by the InP, for example. Herein, the SSID of this public WLAN can be referred as InP-SSID, as shown in FIG. 1

Optionally, assuming that vWLAN of the VNO exists, it would be determined whether to broadcast the SSID of the vWLAN of this VNO according to the policy set by the VNO.

In step S202, if the user equipment i scans and finds the SSID of the vWLAN of its desired VNO, the method goes to step S211. This means that the user equipment will use the SSID of the vWLAN directly to access the vWLAN of its desired VNO.

If the user equipment i scans and does not find the SSID of the vWLAN of its desired VNO in the broadcast, the method goes to step S203. This means that the method will goes directly to step S203 when the broadcast of the AP does not include the SSID of the vWLAN of the VNO (This vWLAN does not exist, or the SSID of this vWLAN has not been broadcast due to the VNO policy, even this vWLAN exists, for example.).

In step S203, the user equipment i accesses the public WLAN deployed by the InP via the SSID of the public WLAN. Specifically, in this step, the corresponding authentication will be conduct based on 802.11 protocol.

In step S204, the user equipment i sends an authentication request to the AP. This authentication request can be sent in the form of user@domain, for example. This authentication request (user@domain) includes the domain information of the VNO (the ID of the VNO, for example), for example. Additionally, this authentication request further includes credential information which enables the VNO to determine whether the user equipment is its subscriber, for example, user equipment account, password and certificate and etc.

This authentication request will be processed by the AP and the AN (AP1 and AN1 shown in FIG. 1, for example), and sent to InP-CMP, for example sent to the AAA server in the InP-CMP. The AP and the AN can identify the location information of the vWLAN needed to be created and insert it into the above authentication request. In one embodiment of the present invention, the AP and the AN can insert the respective identification into the above authentication request. This location information can be then used to help the VNO-CMP to determine the location of the vWLAN needed to be created.

In step S205, based on the domain information of the VNO, the InP-CMP will determine the corresponding VNO, and send the above authentication request to the VNO-COMP for further authentication. Herein, the above location information can be processed by the InP into readable location information.

Additionally, herein, the authentication information can also be checked and/or authenticated by the AAA server in the InP.

In step S206, the VNO-CMP will determine whether the user equipment i is a VNO subscriber based on the credential information in the authentication request. This would be conduct by the proper module in the VNO-CMP, for example, or by the AAA server. If the user equipment is not the subscriber, the VNO-CMP will not serve it, that is, no vWLAN will be created for it.

If the user equipment is the subscriber, the VNO-CMP will determine whether a vWLAN exists at the location according to the location information in the authentication request.

If one vWLAN has already been created at this location, the VNO-CMP will send an access allowing message to the InP-CMP. The InP-CMP will in turn send the SSID of the vWLAN to the user equipment i to help it access to the vWLAN of the VNO. In this step, the VNO-CMP will update its maintained vWLAN information table actually. For example, the VNO-CMP will add the number of the authorized user equipments by one.

Alternatively, if there is no created vWLAN at this location, the VNO-CMP will insert a new entry related to this vWLAN in its maintained vWLAN information table, and configure suitable parameters for this vWLAN, as shown in Table 2.

TABLE 2

| New Entry in the vWLAN Information Table | | | | | |
| --- | --- | --- | --- | --- | --- |
| Location | vWLAN-SSID | Whether to broadcast SSID? | Number of authorized user equipments | Encryption method | 802.11 family |
| AP1.AN1 | VNO-SSID | Yes | 1 | WEP | 802.11n |

In step S207, the VNO-CMP sends an indication message to the InP-CMP, which indicate to create the vWLAN and that the user equipment i is allowed to access the vWLAN. Moreover, the indication message further includes the parameters for this vWLAN.

In step S208, the InP-CMP will create this vWLAN with the parameters of the vWLAN on the corresponding location based on the indication message. This could be implemented by the SDN controller, for example. In this step, the SSID will be allocated to the vWLAN, the policy will be made for the vWLAN and etc. Specifically, the InP-CMP can command the AP to create the corresponding vWLAN based on the indication message of the VNO.

Preferably, in step S209, the InP-CMP will send a vWLAN creation completion acknowledgment to the VNO-CMP to indicate that the creation of the vWLAN is completed.

In step S210, the InP-CMP sends the authentication result message to the user equipment i. This authentication result message indicates the user equipment to access the vWLAN and includes the SSID of the created vWLAN.

In step S211, the user equipment i assesses the vWLAN of its desired VNO based on the SSID of the vWLAN.

In step S212, the user equipment will interact with the VNO-CMP. In this step, any necessary operations will be conduct. For example, the user equipment i communicates with its desired VNO to conduct further authentication and address allocation. After this step, the user equipment i can enjoy the service from its desired VNO via the new created vWLAN.

Figure 3:
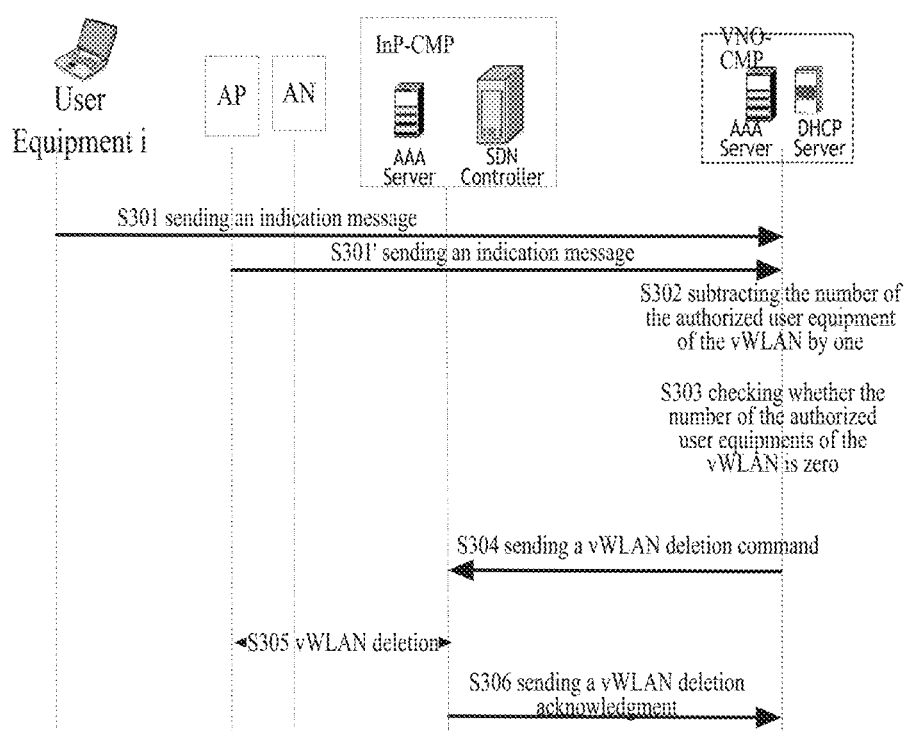
FIG. 3 shows a flowchart for a method of deleting a vWLAN in a Fixed Access Network Sharing environment according to an embodiment of the present invention.

FIG. 3 shows a flowchart for a method of deleting a vWLAN in a Fixed Access Network Sharing environment according to an embodiment of the present invention.

The embodiments of vWLAN deletion can be separated into two scenarios. In the first scenario, when a subscriber disconnects the vWLAN, the subscriber can send the corresponding message to the VNO-CMP. In the second scenario, the subscriber will not send the message actively. Alternatively, the corresponding AP, which manages the vWLAN, detects that the subscriber disconnects the vWLAN, and reports to the VNO-CMP.

Firstly, the first scenario will be discussed in detail.

As shown in FIG. 3, in step S301, once a subscriber/user equipment dis-attaches from a vWLAN, it will send an indication information to the VNO-CMP, which indicates that the subscriber disconnects/dis-attaches from the vWLAN. Preferably, the subscriber will send a DHCP release message to the DHCP server in the VNO-CMP. For example, the related network resources, IP address and etc. are indicated to be released.

In step S302, upon receiving the above indication information, the VNO-CMP will subtract the number of the authorized user equipments of the vWLAN by one.

Then, in step S303, the VNO-CMP will check whether the current number of the authorized user equipments of the vWLAN is zero. That is, the VNO-CMP will check whether there is no subscriber/user equipment for this vWLAN yet.

In step S304, if the current number of the authorized user equipments of the vWLAN is zero, the VNO-CMP will send a vWLAN deletion command to the InP-CMP, which includes the SSID of the vWLAN and the location. Preferably, the VNO-CMP will remove the entry of this vWLAN in the vWLAN information table.

In step S305, the InP-CMP will command to delete the vWLAN in the corresponding location based on the vWLAN deletion command, so as to release the corresponding resources. Specifically, the In-CMP will indicate the related AP to delete the vWLAN, for example, based on the deletion command.

In step S306, the InP-CMP will send a vWLAN deletion acknowledgment to the VNO-CMP, which indicates that the vWLAN is deleted successfully.

Then, the second scenario will be discussed in detail.

In this scenario, when the subscriber de-attaches from the vWLAN, it will send no indication message to the VNO-CMP.

Replacing the step S301 in FIG. 3, the step S301' would be implemented.

In the step S301', when the subscriber de-attaches from the vWLAN, the AP managing the vWLAN will send an indication information to the VNO-CMP, which indicates VNO that the subscriber de-attaches the vWLAN of the VNO. For example, the AP can detect the idle timeout for the subscriber to determine whether the subscriber de-attaches from the vWLAN.

Similarly, after the VNO-CMP receives the indication message, the steps S302 to S306 will be conduct and the details are omitted here.

It shall be appreciated that the foregoing embodiments are merely illustrative but will not limit the invention. Any technical solutions without departing from the spirit of the invention shall fall into the scope of invention, including that different technical features, methods appearing in different embodiments are used to combine to advantage. Further, any

The invention claimed is:

1. A method, in a user equipment in a fixed access network sharing environment where one physical fixed access network is divided into multiple Virtual Access Networks (VAN), of assisting an infrastructure provider and a virtual network operator to create visualized WLAN (vWLAN) dynamically, comprising:
   receiving broadcast from an access point, wherein the broadcast includes a SSID of a public WLAN;
   accessing the public WLAN based on the SSID of the public WLAN;
   sending an authentication request to the access point, wherein the authentication request includes domain information of the virtual network operator, such that creation of a vWLAN is initiated;
   receiving, after the creation of the vWLAN by the infrastructure provider, an authentication result message from the infrastructure provider, wherein the authentication result message includes a SSID of the vWLAN;
   accessing the vWLAN via the access point based on the SSID of the vWLAN; and
   sending indication information to the virtual network operator, when the user equipment disconnects from the vWLAN, wherein the indication information indicates that the user equipment disconnects the vWLAN,
   wherein the virtual network operator is configured to track a number of authorized subscribers connected to the vWLAN, and
   a deletion of the vWLAN is initiated when the number of authorized subscribers connected to the vWLAN is zero.

2. The method according to claim 1, wherein the authentication request further includes credential information for assisting the virtual network operator to authenticate whether the user equipment is its subscriber.

3. The method according to claim 1, wherein the indication information includes a DHCP release message, and the sending includes:
   sending the DHCP release message to a DHCP server of the virtual network operator.

4. A method, in an infrastructure provider in a fixed access network sharing environment where one physical fixed access network is divided into multiple Virtual Access Networks (VAN), of creating visualized WLAN (vWLAN) dynamically, comprising:
   receiving an authentication request from a user equipment in an access node, wherein the authentication request includes domain information of a virtual network operator and location information set by the access node and/or an access point, and the location information is used to indicate location of the vWLAN;
   determining the virtual network operator based on the domain information of the virtual network operator, and forwarding the authentication request to the virtual network operator;
   receiving an indication message from the virtual network operator, wherein the indication message indicates to create the vWLAN and includes parameters of the vWLAN;
   creating the vWLAN with the parameters of the vWLAN at the location;
   sending an authentication result message to the user equipment, wherein the authentication result message indicates the user equipment to access the vWLAN and includes a SSID of the vWLAN; and
   sending indication information to the virtual network operator, when detecting that the user equipment disconnects the vWLAN wherein the indication information indicates that the user equipment disconnects the vWLAN,
   wherein the virtual network operator is configured to track a number of authorized subscribers connected to the vWLAN, and
   a deletion of the vWLAN is initiated when the number of authorized subscribers connected to the vWLAN is zero.

5. The method according to claim 4, wherein the authentication request further includes credential information for assisting the virtual network operator to authenticate whether the user equipment is its subscriber, and the indication message further indicates that the user equipment is allowed to access the vWLAN.

6. The method according to claim 4, wherein the method further comprises:
   sending a vWLAN creation completion acknowledgment to the virtual network operator.

7. A method, in a virtual network operator in a fixed access network sharing environment where one physical fixed access network is divided into multiple Virtual Access Networks (VAN), of creating visualized WLAN (vWLAN) dynamically, comprising:
   receiving an authentication request from an infrastructure provider, wherein the authentication request includes domain information of the virtual network operator and location information, and the location information is used to indicate location of the vWLAN;
   configuring parameters for the vWLAN based on the authentication request;
   sending an indication message to the infrastructure provider, wherein the indication message indicates to create the vWLAN and includes the parameters of the vWLAN;
   receiving indication information from a user equipment or an access point of the vWLAN, which indicates that the user equipment has disconnected from the vWLAN;
   subtracting the number of the authorized subscriber connected to the vWLAN by one based on the indication information;
   checking whether the number of the authorized subscribers is zero; and
   sending a vWLAN deletion command to the infrastructure provider if the number of the authorized user equipments is zero, the vWLAN deletion command including a SSID and the location of the vWLAN,
   wherein the virtual network operator is configured to track a number of authorized subscribers connected to the vWLAN.

8. The method according to claim 7, wherein the authentication request further includes credential information, and the step configuring parameters for the vWLAN based on the authentication request further includes:
   determining whether a user equipment is a subscriber of the virtual network operator based on the credential information; and
   determining whether there is a vWLAN at the location when the user equipment is subscribed to the virtual network operator;
   configuring the parameters for the vWLAN when the vWLAN does not exist;

and wherein the indication message further indicates that the user equipment is allowed to access the vWLAN.

9. The method according to claim 8, wherein a vWLAN information table is stored in the virtual network operator and is used to indicate information associated with at least one vWLAN managed by the virtual network operator, and the method further comprises:
   adding the number of the authorized user equipments of the vWLAN by one, when the vWLAN exists; and
   adding the vWLAN and parameters thereof to the vWLAN information table, when the vWLAN does not exist.

10. The method according to claim 7, wherein the method further comprises:
   receiving a vWLAN creation completion acknowledgment from the infrastructure provider.

11. The method according to claim 7 further comprises:
   initiating the removal of an entry of the deleted vWLAN in a vWLAN information table stored in the virtual network operator.

* * * * *